T. KUPFER.
MILKING DEVICE.
APPLICATION FILED JAN. 15, 1910.
1,057,486.
Patented Apr. 1, 1913.
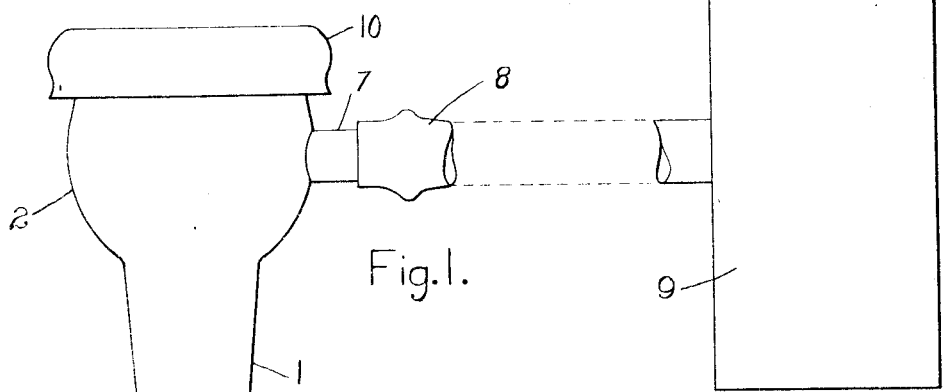
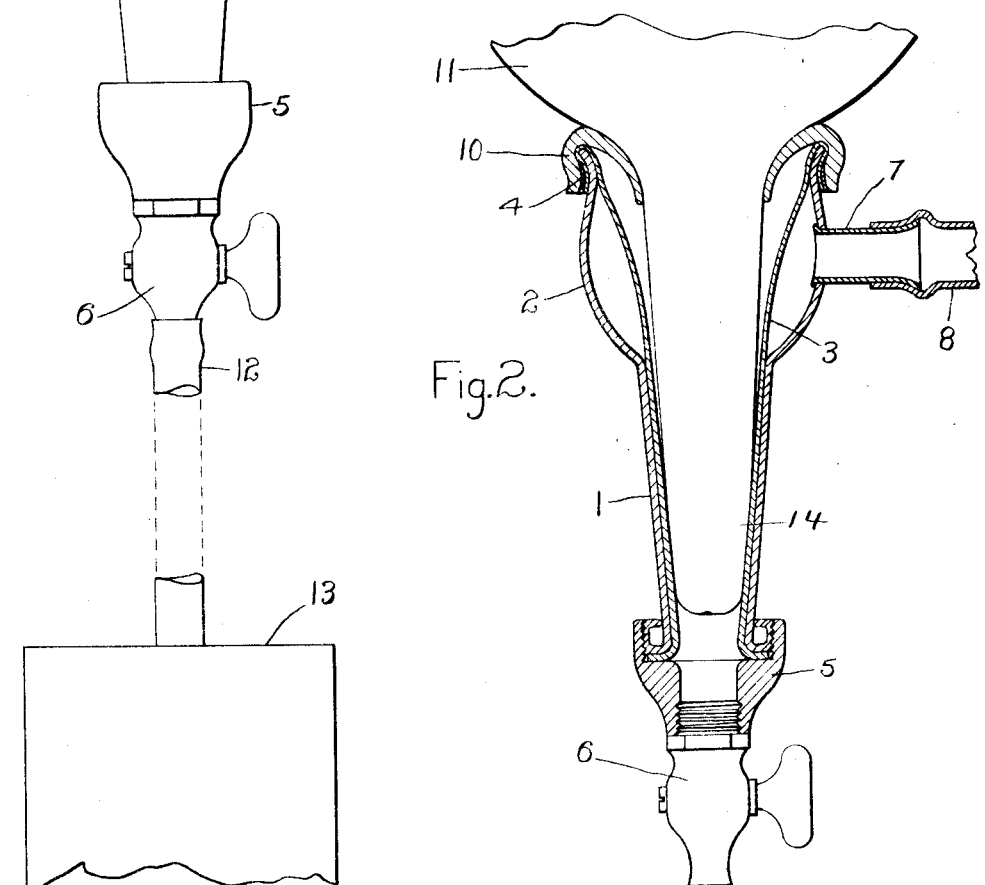
Witnesses
George E. Higham
Frank J. Shulen
Inventor
Theodore Kupfer
By Brown Williams
Attorneys

UNITED STATES PATENT OFFICE.

THEODORE KUPFER, OF MADISON, WISCONSIN.

MILKING DEVICE.

1,057,486.  Specification of Letters Patent.  Patented Apr. 1, 1913.

Application filed January 15, 1910. Serial No. 538,172.

*To all whom it may concern:*

Be it known that I, THEODORE KUPFER, a citizen of the United States, residing at Madison, in the county of Dane and State of Wisconsin, have invented a certain new and useful Improvement in Milking Devices, of which the following is a full, clear, concise, and exact description, reference being had to the accompanying drawings, forming a part of this specification.

My invention relates to an improved form of milking devices, by which the operation of milking the cow may be imitated by mechanical means. This is accomplished by means of compressed air in such a manner that the teats of the cow are compressed, beginning at their base and extending to the points at recurring intervals, and simultaneous suction is exerted upon them to remove the milk from the ducts in the teats.

It is to be understood that the compression referred to may be exerted in any suitable manner, either by having a source of constant supply of air under pressure which is communicated to the compressing machine at recurring intervals, or by having a suitable pump adapted to compress the air, as required, at periodic intervals. Similarly, the source of suction may be provided in any suitable manner, either by having a tank from which the air is constantly exhausted, and connecting this tank at recurring intervals with the milking device, or by the use of a suction pump adapted by its operation at recurring intervals to directly exert a suction upon the teats of the cow.

The several drawings illustrating my invention are as follows:

Figure 1 is a diagrammatic view of the milking device. Fig. 2 is a vertical sectional view taken through the center of the device, showing the same in place upon the teat of a cow and against the udder.

Similar numerals refer to similar parts throughout the several views.

As shown in the drawings, the device consists essentially of a conical metallic casing 1 having an enlarged upper portion 2, within which a conical tube 3 of flexible material, as india-rubber, is disposed. The tube 3 is secured to the upper end of the casing 1 by means of a binding wire or cord 4, or it may be so secured in any other suitable manner, and the lower end of the tube 3 is secured to the lower end of the casing by means of a collar 5 screwed upon an upturned flange formed at the lower end of the casing 1. The lower end of the tube 3 is clamped between the collar 5 and the lower end of the casing 1. A valve 6 is secured in the collar 5 to control, in part, the operation of the device.

The tube 3 is of smaller diameter at its upper portion than the enlarged portion 2 of the casing 1, as result of which a clearance is formed at this point around the tube 3. A connection 7 extends from the enlarged portion 2 of the casing, which connection communicates by a tube 8 with a mechanism 9 adapted to supply to the tube 8 at recurring intervals, air under pressure. The mechanism 9 may consist either in a supply of air under constant pressure and means for communicating this air at recurring intervals to the tube 8, or it may consist of a pump of any desired construction adapted to directly exert a pressure upon the air in the tube 8, as desired. A ring 10 of flexible material, as india-rubber, is placed over the upper edge of the casing 1, and is provided with a downwardly extending flange or lip adapted to engage the base of the teat when the device is in place for milking. This ring 10 also serves to protect the udder 11 from injury. A tube or pipe 12 is connected with the valve 6, and communicates with a mechanism 13 adapted to exert suction upon the pipe 12 at recurring intervals, which preferably are synchronous with the intervals of compression exerted upon the air in the pipe 8.

The mechanism 13 may consist either of a tank from which the air is constantly exhausted, and valve mechanism for establishing communication between such tank and the pipe 12 at recurring intervals, or it may consist of a pump of any desired construction adapted to directly exert suction upon the pipe 12 as desired.

The tube 3 is so formed that it is thinner at its upper portion than at the lower portion, as a result of which, when air pressure is exerted upon the air in the clearance formed within the enlarged portion 2, the upper portion of the tube 3 is first contracted, thus contracting the teat 14 at its base, after which the continued application of the pressure contracts the tube 3 downwardly, thus serving to work the milk from the teat, as in the usual operation of milking by hand. It is also to be observed that the compression of the upper portion of the tube 3 presses upwardly upon the inner flange of the ring 10, and thus forces this flange inward against the base of the teat, and serves to close the ducts extending from the udder 11 into the teat 14. The application of suction to the lower end of the tube 3 simultaneously with the application of pressure upon the air in the upper portion of the casing 1 serves to in part extract the milk from the teat 14 and to remove the milk thus extracted, from the milking device into any suitable receptacle, which receptacle may be a tank from which the air is constantly exhausted by suitable means, not shown.

While I have shown my invention in the particular embodiment herein disclosed, I do not, however, limit myself to this construction, but desire to claim any equivalent that will suggest itself to those skilled in the art.

I claim—

1. In a milking device, a casing, a flexible tube disposed in said casing, said casing being flared at one end to form an annular chamber around the upper half of said flexible tube, the lower half of said flexible tube fitting snugly against said casing, and a connection whereby a source of pneumatic pulsations may have communication with said annular chamber, the upper half of said tube being adapted to contract before air is admitted between the lower half of said tube and said casing.

2. In a milking device, a casing, a flexible tube disposed in said casing, said casing being flared at one end to form an annular chamber around the upper end of said tube, the lower end of said tube fitting snugly against said casing, and a connection whereby a source of air supply may have communication with said annular chamber, substantially as described.

3. In a milking device, the combination of a casing, a flexible tube disposed in said casing, there being normally an annular chamber between the casing and the upper portion of said tube, the lower portion of said tube fitting snugly against said casing, and a connection whereby a source of pneumatic pulsations may communicate with said annular chamber, substantially as described.

4. In a milking device, a substantially funnel-shaped casing, a substantially cone-shaped flexible tube disposed within said funnel-shaped casing, said flexible tube normally fitting snugly against the lower or tubular portion of the funnel-shaped casing, there being normally an annular chamber between the said flexible tube and the upper or body portion of the funnel-shaped casing, and means for connecting said annular chamber with a source of pneumatic pulsations.

5. In a milking device, a casing consisting of a lower conical portion and a substantially bowl-shaped upper portion, a cone-shaped flexible tube disposed in said casing, said tube normally fitting snugly against the said conical lower portion of said casing, there being normally an annular chamber between the bowl-shaped portion of the casing and said flexible tube, means for connecting said annular chamber with a source of pneumatic pulsations, and means for retaining the device in operative position.

In witness whereof, I hereunto subscribe my name this 12th day of January, A. D. 1910.

THEODORE KUPFER.

Witnesses:
ARTHUR H. BOETTCHER,
LEONARD W. NOVANDER.

Copies of this patent may be obtained for five cents each, by addressing the "Commissioner of Patents, Washington, D. C."